March 5, 1968   W. R. EPPERLY ET AL   3,372,108
CONVERTING NAPHTHENES TO AROMATICS AND SEPARATING THE AROMATICS
Filed July 25, 1966
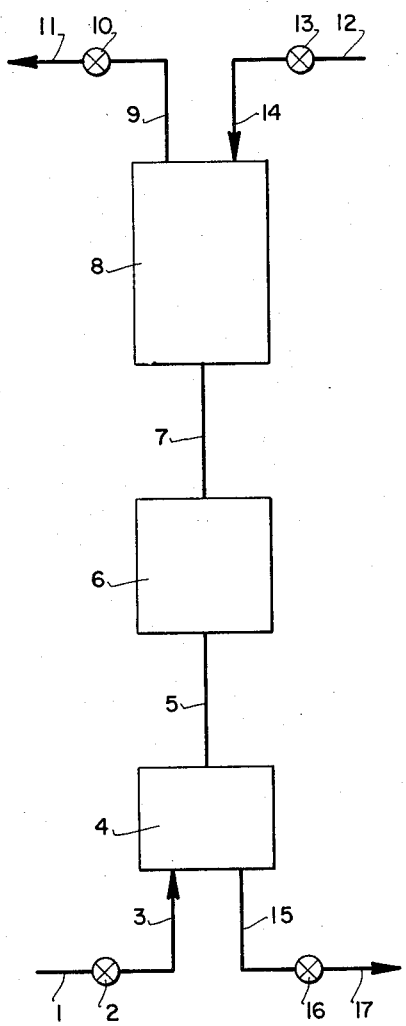
W. R. EPPERLY
C. W. TYSON, JR.   INVENTORS
BY Michael Conner
PATENT ATTORNEY

United States Patent Office 3,372,108
Patented Mar. 5, 1968

3,372,108
CONVERTING NAPHTHENES TO AROMATICS
AND SEPARATING THE AROMATICS
William R. Epperly, New Providence, and Charles W. Tyson, Jr., Westfield, N.J., assignors to Esso Research and Engineering Company, a corporation of Delaware
Filed July 25, 1966, Ser. No. 567,654
7 Claims. (Cl. 208—95)

ABSTRACT OF THE DISCLOSURE

The present disclosure relates to a process for removing cyclic constituents such as cyclic paraffins and aromatics from fuels. The fuel is first subjected to a dehydrogenation step during which step the naphthenes are converted to aromatics. The fuel is then contacted with a molecular sieve which is adapted to selectively adsorb the aromatic compounds. The hydrogenation and adsorption steps may be combined in a single zone or carried out separately. Both the dehydrogenation catalyst and the adsorbent are periodically regenerated. In a preferred embodiment, ammonia is employed to both reactivate the catalyst and desorb the molecular sieve. The fuels obtained by this process exhibit improved luminometer numbers and are useful as jet fuels and in certain fuel cells.

---

This invention pertains to the production of improved fuels. More particularly, this invention pertains to a method of removing cyclic constituents from fuels. These cyclic constituents may be saturated, such as cyclic paraffins or aromatic such as benzene and derivatives thereof. This is accomplished by a combination process in which a fuel is initially contacted with a dehydrogenation catalyst in order to dehydrogenate cycloparaffins which are in the feedstock; following this, the resulting aromatics and other unstable species in the fuel are adsorbed onto a solid adsorbent such as a molecular sieve. According to a particular embodiment of this invention the adsorbent may be desorbed and the dehydrogenation catalyst reactivated in one integrated operation.

There are numerous instances where the separation of cycloparaffins or naphthenes such as normal hexal cyclohexane and decahydro naphthalene are important in industry. For instance, in the area of manufacture of ultra high luminometer number jet fuels and kerosenes, the removal of naphthenes is essential since they have a low luminometer number relative to normal and isoparaffins. Luminometer number is a dimensionless term which is used as a measure of flame temperature at a fixed flame radiation in the green-yellow band of the visible spectrum. The luminometer number of a fuel can be correlated with the combustion characteristics of fuels for use in jet engines and the like. It is determined by a technique described in ASTM D-1740. The luminometer number of a jet fuel is an important criterion and must be carefully controlled.

The presence of aromatics within fuels as well as unstable nonhydrocarbons such as sulfur and nitrogen-containing compounds unfavorably affects both the thermal stability and the luminometer number of the product. Thus, the removal of cyclic saturated compounds and aromatics is essential to the proper functioning of a fuel. In the case of jet fuels for supersonic aircraft, removal of aromatics and nonhydrocarbons are necessary in order to obtain a satisfactory thermal stability. Otherwise, deposits in jet engines will make the fuel unacceptable. Naphthene removal is necessary in order to maximize luminometer number. Increasing luminometer number is desired in a fuel because it reduces the temperature of the components of the jet engine and thus improves engine life. Furthermore, the heat content per pound of fuel can be maximized by removing aromatics and naphthenes. In this way, the weight of fuel required for a flight can be minimized.

Fuel cells which utilize hydrocarbons require fuels rich in normal and isoparaffins for different reasons. Nonhydrocarbons such as sulfur compounds poison fuel cell catalysts and must be removed. Aromatic and naphthenic compounds are difficult to convert to electricity and thus should be removed from the fuel. Therefore, the fuels required for supersonic jet engines and hydrocarbon fuel cells are similar.

According to this invention, it has unexpectedly been discovered that naphthenes and aromatic compounds may be efficiently removed from a fuel by means of an integrated dehydrogenation-molecular sieve separation process. More particularly, a fuel is initially subjected to a dehydrogenation step such as catalytic reforming and after substantially all naphthenes present are converted to aromatics the fuel is then contacted with a molecular sieve which is adapted to selectively adsorb aromatic compounds to the substantial exclusion of normal or isoparaffins. Such adsorbents are zeolitic in nature and have pore openings of about 6.5 to 15 A. When a mixture of aromatics and aliphatics is passed over said zeolitic adsorbent, the effluent is rich in aliphatic compounds and conversely the adsorbed phase is enriched with aromatics. Broadly, adsorbents which fall into this category include type X, type Y sieves or mordenite. More specifically, type X sieves with monovalent or divalent cations such as those of the alkaline, alkaline earth and transition metal series are used. Still more specifically, the well known 10X and 13X molecular sieve categories may be utilized. The various molecular sieves having Angstrom openings of 6.5 to 15 A. are well known in the art, and any of these may be utilized in the instant invention.

Concerning the dehydrogenation or hydroforming, no criticality exists concerning the various conditions which may be utilized. Hydroforming is now a matter of record and commercial practice in this country. Basically, the operation involves the contacting of a naphtha, either virgin, cracked, Fisher-Tropsch or any mixture thereof, with a solid catalytic material. The contacting takes place at elevated temperatures and may take place in the presence of added hydrogen. However, the process itself produces substantial amounts of hydrogen and, in actuality, this will on occasion surpass the initial hydrogen which has been added to repress deactivation of the catalysts by carbon formation. As will be shown, very low hydrogen pressures can be used.

The reactions involved in hydroforming are: (1) dehydrogenation of naphthenes to the corresponding aromatic hydrocarbons as where methylcyclohexane is dehydrogenated to form toluene, (2) isomerization of ring compounds such as ethylcyclopentane to form methylcyclohexane, which latter compound is then dehydrogenated to form toluene and (3) dehydrocyclization of paraffins to aromatics such as n-heptane to form toluene.

Thus, the instant invention may be summarized as a fuel treating technique which involves the following steps. Initially, a fuel boiling broadly in the range of 150° to 700° F. is passed into a catalytic hydroforming zone wherein at least a portion of the naphthenes present in the fuel are converted to aromatics. Both one-ring and two-ring naphthenes are converted. Following this, the fuel is passed over a molecular sieve separation zone in which the adsorbent pore openings are about 6.5 to 15 A. At this time the aromatic constituents of the feedstock are selectively removed. A tandem series of beds may be utilized alternating reforming zones with adsorption zones. In a specific embodiment of the instant invention, the molecular sieves separation bed is desorbed with a desorbing agent which will be discussed at length. It has also unexpectedly been found that the same desorbing agent may be utilized to reactivate the catalyst within the catalytic reforming zone. In essence, the desorbing agent is performing a dual function. Initially, the desorption of the molecular sieve by removing therefrom the aromatics which have become adsorbed onto the sieve and secondarily the reactivation of the catalysts utilized in the catalytic hydroforming zone.

As an alternative approach, hydroforming catalyst and adsorbent can be mixed. In this case, dehydrogenation of naphthenes and adsorption of aromatics take place in the same zone.

In more detail, a fuel is to be treated by the instant invention. This fuel will find its predominant uses as a jet fuel and as a fuel for a hydrocarbon fuel cell. The fuel oil may be a naphtha or gas oil boiling in the range of 150° to 700° F., preferably 150° to 600° F. and most preferably will be a kerosene boiling in the range of 300° to 550° F. A kerosene feed will contain aromatics, olefins, normal paraffins, isoparaffins and cycloparaffins. In addition, small amounts of compounds containing sulfur, nitrogen and oxygen may be present. As mentioned above, the presence of the aromatics and the cycloparaffins or naphthenes serves to deleteriously affect the luminometer number of the fuel. Consequently, it is desirable to remove substantially all of the cycloparaffins and the aromatic compounds which are present. The removal of these compounds may be effected in a variety of ways. The fuel may first be passed over an adsorbent zone where the aromatics are selectively adsorbed to the exclusion of the other compounds present. Following this, the fuel may be subjected to catalytic dehydrogenation, and naphthenes which are present will be selectively converted to aromatics. After that, the fuel may be passed over another adsorbent bed in order to remove the newly formed aromatics. As should be obvious, any tandem arrangement of catalyst and adsorbent may be utilized. It is preferred to maintain discrete zones of adsorbent and catalysis however, the two can be intermingled. In one preferred embodiment of this invention the feed may be pretreated with an adsorbent bed such as zeolitic molecular sieves with pore sizes of 6.5 to 15 A. in order to remove sulfur and other nonhydrocarbons. This embodiment would be employed if the level of nonhydrocarbons is sufficient to deactivate the hydroforming catalyst.

Turning to the process itself, a kerosene feedstream is introduced into a catalytic hydroforming zone. Catalysts that may be utilized within this zone include those containing 0.01 to 1.0 wt. percent of platinum or 0.1 to 2.0 wt. percent palladium dispersed upon a highly pure alumina support such as is obtained from aluminum alcoholate as per U.S. Patent No. 2,636,865 or from an alumina hydrosol prepared by hydrolyzing aluminum metal with dilute acetic acid in the presence of very small catalytic amounts of mercury. A suitable catalyst comprises about 0.2 to 0.8 wt. percent platinum widely dispersed upon alumina in the eta or gamma phase derived from a suitable aluminum alcoholate and between about 0.3 and 1.2 wt. percent $Cl_2$ and having a surface area of about 50 to 300 square meters per gram. However, a variety of other catalysts may be utilized such as platinum on desurfaced silica-alumina, chromia on alumina, or nickel on alumina or silica.

Conditions within the hydroforming zone may vary widely. Pressures may vary between 0 and 100 p.s.i.g. Temperatures within the hydroformer may vary between about 500 and 1000° F., preferably between 600 and 900° F. Hydrogen can be circulated through the hydroforming zone at a rate of up to 10,000 cubic feet per barrel of liquid feedstock. However, as the examples will show, hydrogen circulation is not essential. The space velocity or weight in pounds of feed charge per hour per pound of catalyst depends upon the age or activity level of the catalyst, the character of the feedstock, and miscellaneous factors. Ordinarily, it may vary from about 0.5 w./hr./w. to 20 w./hr./w. and as preferably 1 to 10. Within this hydroforming zone about 10 to 90% of the cycloparaffins present are converted to aromatics.

Following this conversion of naphthenes to aromatics, the feedstream is fed into a molecular sieve separation zone in which the pore openings are between 6.5 and 15 A. It is preferred to pass the feedstream into the molecular sieve separation zone in the vapor phase.

The adsorption temperature and pressure are substantially the same as those used in the dehydrogenation step. About 0.01 to 1 w./w. of feed may be passed over the adsorbent bed in a given cycle, preferably 0.06 to 0.5. Displacing agent may be introduced in conjunction with the feedstream if it is so desired at up to one mol per mol of feed. The adsorption cycle may take from 0.5 minutes to an hour, preferably 1 to 20 minutes and most preferably about 3 to 15 minutes. After the adsorption step, a sievate is recovered which comprises a fuel from which about 60 to 99% of the original cyclic compounds (cycloparaffins and aromatics) have been removed. This will constitute a fuel with a luminometer number which is about 75 to 130 as compared to its original luminometer number of about 50.

After the adsorption of the aromatics from the fuel the molecular sieve bed must be desorbed. Desorption is accomplished by passing a displacing agent over the molecular sieve. Ammonia is an ideal displacing agent for this process. Because it is strongly adsorbed by molecular sieves, it efficiently displaces the adsorbed aromatics. Furthermore, it can be displaced in the adsorption step by aromatics so that no separate step for ammonia removal is required. In addition, it is stable under the conditions of the process. Finally, ammonia has advantages in this dehydrogenation/adsorption process and they will be discussed.

Preferably, desorption is carried out a about the same temperature as is adsorption. Pressure for desorption may vary between 0 and 100 p.s.i.g. The amount of displacing agent introduced is 0.01 to 5 w./w., preferably 0.02 to 2 w./w. The time of desorption may be equal to that of adsorption.

Other desorption techniques which are well known in the art can be employed. For example, desorption by raising temperature or purging by a hydrocarbon stream as well as lowering pressure may be utilized.

However, displacement with ammonia is preferred since it has unexpectedly been discovered that it may be used to perform the dual function of desorbing the molecular sieve bed and also regenerating the hydroforming catalyst. The hydroforming catalyst tends to deactivate after a period of operation of 0.5 to 60 minutes. Therefore, the hydroforming operation of the instant invention takes place in 0.5 to 60 minutes. At the end of this period, the catalyst is reactivated with ammonia for 0.5 to 60 minutes. This operation is concomitant with the desorption of the adsorption zone and the same displacing agent can be used.

Several obvious variations of the instant invention are readily apparent. For instance, in a preferred embodiment, ammonia in the amount of 0.1 to 1 mol per mol of feed is added to the feedstock which is introduced into the hydroforming zone and then passed into the adsorption zone. The presence of this ammonia serves to facilitate adsorption and also increases the efficiency of the hydroforming operation by reducing deactivation rate.

In another preferred embodiment sulfur compounds and other compounds which reduce catalysts activity such as nitrogen and oxygen containing compounds are removed by a discrete zone of adsorbent which is placed on the feed inlet side of the catalyst zone. This adsorbent will have Angstrom openings of 6.5 to 15 A. and serves to remove about 90 to 99.9% of the impurities present. In addition, the discrete adsorbent serves to remove a certain amount of the aromatics in the feed, i.e. about 25 to 75%. This improves the subsequent conversion of the naphthenes within the catalyst zone because the back reaction of aromatics to form cycloparaffins is less important. In addition, the extra adsorbent zone serves to keep sulfur and other undesirables away from the catalyst since desorption is ordinarily countercurrent and the discrete zone precedes the inlet to the catalyst zone. It should be emphasized that although it is preferred to use countercurrent desorption this is not required.

Referring to FIGURE 1 and the last embodiment described, an example of the operation of this process can be visualized. A kerosene boiling range feed containing aromatics, naphthenes, olefins, normal paraffins, isoparaffins and nonhydrocarbons is passed through line 1, valve 2, and line 3 into zone 4 which conttains type X molecule sieve adsorbent. In zone 4, nonhydrocarbons which poison dehydrogenation catalysts are removed and a portion of the aromatics are removed. The purified feed is passed through line 5 into zone 6 which contains dehydrogenation catalyst. In this zone, naphthenes are converted to aromatics. The effluent stream passes through line 7 into zone 8 which contains a molecular sieve adsorbent. In zone 8, the newly formed aromatics are adsorbed and the product feed passes out of the system through line 9, valve 10, and line 11, and is recovered.

When the adsorbents in zones 4 and 8 approach saturation or the catalyst in zone 6 deactivates, feed flow is terminated by closing valves 2 and 10. At this time, ammonia is introduced through line 12, valve 13, and line 14 into zone 8. It passes from zone 8 through line 7 to zone 6. Then it passes to zone 4 through line 5 and finally is discharged through line 15, valve 16, and line 17. This ammonia step desorbs aromatics from zone 8, and aromatics and nonhydrocarbons from zone 4. It has been found unexpectedly that ammonia also reactivates the dehydrogenation catalyst in zone 6. When the step is completed, feed flow is resumed. By using two of the three-bed systems shown in FIGURE 1, continuous flow of feed and ammonia can be maintained.

In the usual case, the ammonia used to reactivate the adsorbents and catalyst is recycled from the effluent stream of lines 11 and 17. The gaseous stream can be separated from the hydrocarbon components by conventional condensation of the hydrocarbons. The ammonia recovered in this manner contains hydrogen since it is produced as naphthenes are dehydrogenated. In order to maintain a constant volume of recycle gas, it is necessary to purge hydrogen from the system at approximately the rate at which it is formed.

FIGURE 1 is a schematic representation of the process of the instant invention.

The present invention may be practiced with one or a series of beds; that is to say, a single series of one catalyst and adsorption bed may be used or a tandem series of several beds. Preferably, the invention will be practiced with more than one bed of catalyst and adsorbent, e.g., two beds so that when one of the beds is in operation the other may be desorbed or burned as the case may be. In this manner, the operation is substantially continuous so that feed may be diverted from one series of beds to the other series when it is desired to desorb one of the beds. It will also be readily apparent that more then two series of beds may be utilized. As previously mentioned the adsorbent and catalyst can also be mixed together.

*Example 1*

In this example an Aramco $C_9$ through $C_{14}$ kerosene feedstock boiling between 300° and 450° F. was used. The feed was initially dearomatized by adsorption onto a type X molecular sieve. Consequently, when the feed was passed into the dehydrogenation zone of the instant invention, it contained 0.1 wt. percent aromatic and less than 10 p.p.m. of sulfur.

This feedstock was passed at the rate of 6 w./hr./w. over an alumina catalyst containing 0.6 wt. percent of platinum.

Two beds of this catalyst were utilized and each of them contained 40 grams of the catalyst. The beds were operated cyclically with one bed being exposed to feed and the other to ammonia displacing agent. The bed positions were reversed every 10 minutes. The feed rate was 6 w./hr./w., the temperature was 700° F. and the pressure was 5 p.s.i.g. When utilizing ammonia to reactivate the bed, ammonia was fed at the same temperature and a rate of 1.8 w./hr./w. and pressure was maintained at 15 p.s.i.g. It was found that signficant amounts of aromatics were produced in the bed. This was shown by an increase in the refractive index of the product from 1.4230 to 1.4271 and the appearance of hydrogen in the effluent streams. The indicated increase in the refractive index corresponds to an increase in aromatic content of about 3.7% by weight in the hydrocarbon effluent.

After 2 w./w. of feed had been passed over the bed, a product with an aromatic content of about 1.8% by weight was collected. Deactivation had occurred but appreciable activity was maintained. This activity was totally unexpected in view of earlier experiments, see Sinfelt (J. Phys. Chem. 66), 793 (1962) for a comparison. In that case the activity of a platinum catalyst dropped drastically after the passage of only 0.23 w./w. of feed when no ammonia is used. Thus, the use of the ammonia displacing agent serves to restore the activity of the catalyst.

Substantial dehydrogenation activity was also obtained when 0.18 mol of amomnia per mol of feed was used in the feed step.

*Example 2*

In this example, substantially the same conditions as in Example 1 are utilized. However, following the dehydrogenation step the feed, rich in aromatics, is passed into an adsorption zone. The adsorption zone contains type X molecular sieve. Temperature in the zone is 700° F., pressure is 5 p.i.s.g. and the rate of introduction is 2 w./hr./w. After about 10 minutes, the flow of feed is stopped and the bed is desorbed. Desorption is accomplished by ammonia which is passed over the bed at substantially identical conditions to those of adsorption. The ammonia rate is 0.6 w./w./hr. and is equivalent to the amount used in Example 1.

An effluent is recovered from which about 10 wt. percent of the naphthenes have been removed. This will result in a considerably improved luminometer number.

Although this invention as been described with some degree of particularly, it is intended only to be limited by the attached claims.

What is claimed is:

1. A process for increasing the luminometer number of a fuel, said fuel boiling in the range of 150° to 700° F. which comprises contacting said fuel with a dehydrogenation catalyst at reaction conditions wherein at least a portion of the naphthenes present in said fuel are converted to aromatics, and the said catalyst is lowered in activity level, passing said aromatic containing fuel into a molecular sieve separation zone, said molecular sieve separation zone containing a molecular sieve having pore openings of 6.5 to 15 A. in diameter whereby substantially all of said aromatics are adsorbed and removed from said fuel, recovering a fuel depleted in naphthenes, passing ammonia displacing agent over said dehydrogenation catalyst and said molecular sieve whereby said catalyst is at least partially reactivated and said aromatics adsorbed on said molecular sieve are at least partially desorbed.

2. The process of claim 1 wherein said fuel is a fuel for a hydrocarbon fuel cell.

3. A process for increasing the luminometer number of a kerosene range feedstock from which at least a portion of the aromatics have been removed which comprises passing said feedstock into a first zone, dehydrogenating said feedstock in said first zone by contacting said feedstock with a dehydrogenation catalyst at conversion conditions whereby the naphthenes in said feedstock are converted to aromatics, passing the aromatic containing feedstock over a molecular sieve having pore openings of 6.5 to 15 A., said molecular sieve being maintained in said first zone, continuing the passage of said kerosene feed through said first zone till said molecular sieve is substantially saturated with aromatics, and the activity level of said catalyst is reduced, diverting said kerosene feed into a second zone said second zone containing a dehydrogenation catalyst and a molecular sieve having 6.5 to 15 A. pore openings, passing ammonia displacing agent through said first zone whereby said aromatics adsorbed onto said molecular sieve are at least partially desorbed and said catalyst is at least partially reactivated.

4. The process of claim 3 wherein said dehydrogenation catalyst consists of a noble metal on a refractory support.

5. The process of claim 3 wherein said molecular sieve adsorbent is type X sieve.

6. The process of claim 3 wherein said molecular sieve adsorbent is type Y sieve.

7. The process of claim 3 wherein the molecular sieve adsorbent and the dehydrogenation catalyst are mixed and contained in one zone.

References Cited

UNITED STATES PATENTS

| | | | |
|---|---|---|---|
| 3,328,289 | 6/1967 | Streed | 208—15 |
| 2,899,379 | 8/1959 | Wilchinsky et al. | 208—95 |
| 3,063,934 | 11/1962 | Epperly et al. | 208—91 |
| 3,216,929 | 11/1965 | Favre | 208—15 |
| 3,242,066 | 3/1966 | Myers | 208—95 |

FOREIGN PATENTS 870,474  6/1961  Great Britain.

HERBERT LEVINE, *Primary Examiner.*